United States Patent
Volkov (10) Patent No.: US 9,660,963 B2
(45) Date of Patent: May 23, 2017

(54) ADAPTIVE ENCRYPTION OPTIMIZATION

(71) Applicant: MOBILE IRON, INC., Mountain View, CA (US)

(72) Inventor: Alexei Volkov, Mountain View, CA (US)

(73) Assignee: MOBILE IRON, INC., Mountain View, CA (US)

(*) Notice: Subject to any disclaimer, the term of this patent is extended or adjusted under 35 U.S.C. 154(b) by 0 days.

(21) Appl. No.: 15/059,007

(22) Filed: Mar. 2, 2016

(65) Prior Publication Data
US 2017/0085530 A1   Mar. 23, 2017

Related U.S. Application Data

(63) Continuation of application No. 14/561,071, filed on Dec. 4, 2014, now Pat. No. 9,306,913.

(60) Provisional application No. 61/911,675, filed on Dec. 4, 2013.

(51) Int. Cl.
*H04L 29/06* (2006.01)

(52) U.S. Cl.
CPC .................. *H04L 63/029* (2013.01)

(58) Field of Classification Search
CPC .................................................. H04L 12/4633
USPC .......................................................... 713/151
See application file for complete search history.

(56) References Cited

U.S. PATENT DOCUMENTS

| | | | | |
|---|---|---|---|---|
| 5,889,863 A | * | 3/1999 | Weber | G06Q 20/00 705/39 |
| 6,094,485 A | * | 7/2000 | Weinstein | H04L 63/105 380/30 |
| 2003/0200321 A1 | * | 10/2003 | Chen | H04L 63/0272 709/229 |
| 2006/0089121 A1 | * | 4/2006 | Elgebaly | H04L 63/0272 455/410 |
| 2007/0258415 A1 | * | 11/2007 | Lu | H04L 63/102 370/338 |

* cited by examiner

*Primary Examiner* — Peter Shaw
(74) *Attorney, Agent, or Firm* — Van Pelt, Yi & James LLP (57) ABSTRACT

Adaptive encryption optimization is disclosed. A first secure tunnel is established between a device and a node. It is determined that a second secure tunnel between an application on the device and a server has been established. The second secure tunnel is established at least in part using the first secure tunnel. The first secure tunnel is removed based at least in part on the determination that the second secure tunnel has been established.

19 Claims, 10 Drawing Sheets

ADAPTIVE ENCRYPTION OPTIMIZATION

CROSS REFERENCE TO OTHER APPLICATIONS

This application is a continuation of co-pending U.S. patent application Ser. No. 14/561,071, entitled ADAPTIVE ENCRYPTION OPTIMIZATION, filed Dec. 4, 2014, which claims priority to U.S. Provisional Patent Application No. 61/911,675, entitled ADAPTIVE ENCRYPTION OPTIMIZATION FOR VPN, filed Dec. 4, 2013, both of which are incorporated herein by reference for all purposes.

BACKGROUND OF THE INVENTION

Encryption and/or other security approaches are often used to secure data transferred between a device and a protected server over, for example, a public network. A virtual private network (VPN) connection may be established to provide full encryption of data from a VPN client on a device to a VPN Server. In certain cases, an application on the device and a protected server (such as an application backend server) may also use encryption at the application layer. In some cases, this may cause double encryption in, for example, the VPN tunnel. Double encryption may include, for example, encryption at the application layer and at the VPN layer. Double encryption may unnecessarily stretch client and server resources, waste bandwidth over cellular connections, and/or lead to reduced device battery life.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Adaptive encryption optimization is disclosed. A first secure tunnel is established between a device and a node. It is determined that a second secure tunnel between an application on the device and a server has been established. The second secure tunnel is established at least in part using the first secure tunnel. The first secure tunnel is removed based at least in part on the determination that the second secure tunnel has been established.

Figure 1:
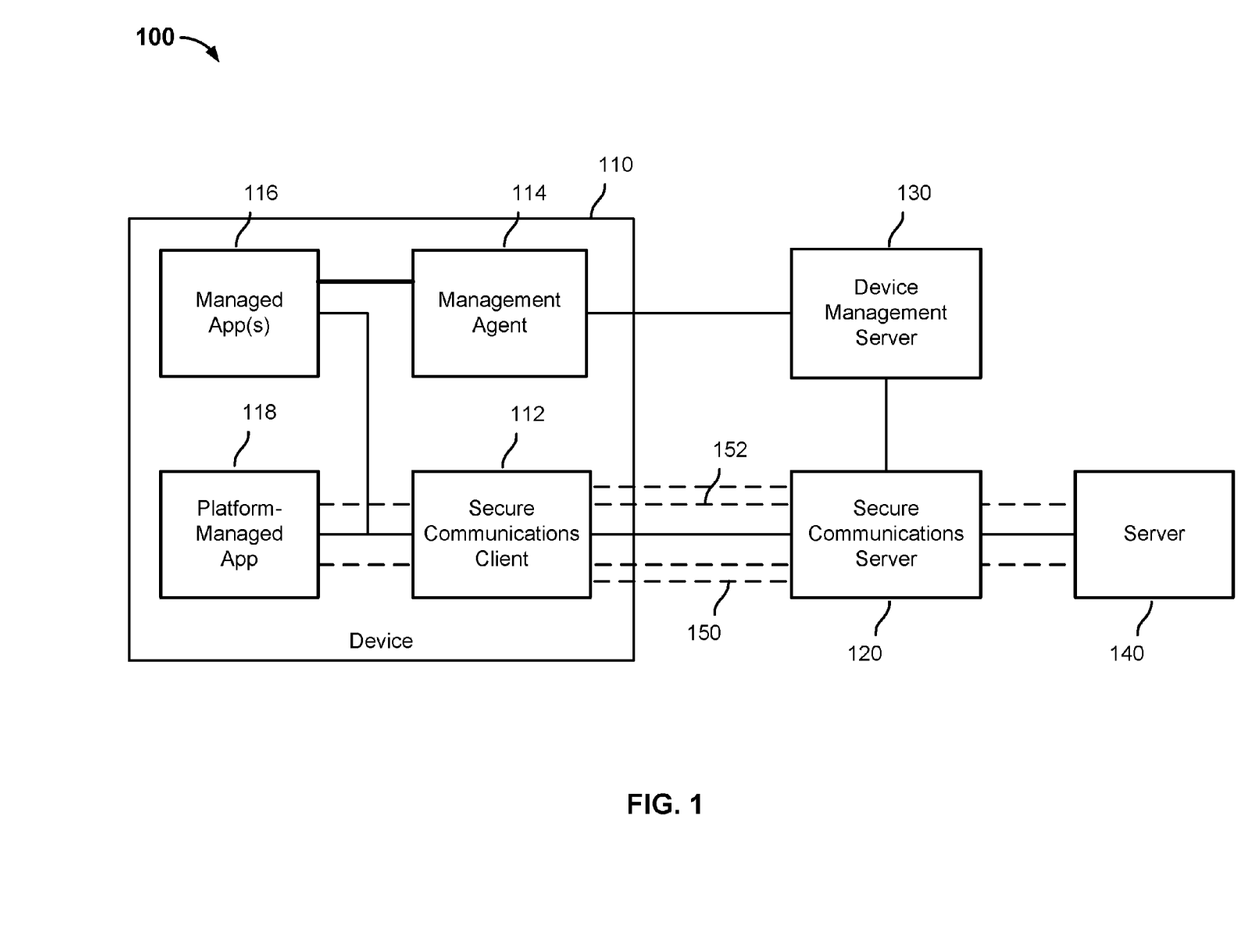
FIG. 1 is a block diagram illustrating embodiments of a system to securely transfer data between a device and a server.

FIG. 1 is a block diagram illustrating embodiments of a system to securely transfer data between a device and a server. In the example shown, a system 100 to adaptively optimize encryption includes a device 110, a secure communications server 120 (e.g., a node, security enforcement node), a device management server 130, and/or other components. A device 110 may include a mobile device, smartphone, tablet, a laptop computer, desktop computer, and/or any other computing device. The device 110 may include secure communications client(s) 112, a management agent 114, managed applications 116, platform-managed applications 118, non-managed applications, and/or other components. In various embodiments, a management agent 114 performs operations on behalf of the device management server 130. The management agent 114 may, for example, control and/or configure one or more managed applications 116 to perform various operations disclosed herein. The management agent 114 may, for example, configure one or more managed applications 114 to provide data to the secure communications client 112 for transmission to the secure communications server 120 and/or servers 140. In certain cases, platform managed applications 118 are configured to securely transfer data to a secure communications server 120 and/or servers 140 via the secure communications client 112. A platform management engine (not shown) associated with an operating system of the device 110 may configure one or more applications 116, 118 to send data to a server 140 via a secure communications client 112 and/or secure communications server 120. A server 140 may include, for example, an application server, a backend server, an enterprise server, a protected server, a protected service, and/or any other type of server.

In various embodiments, a secure communications client 112 establishes a secure communications tunnel with the secure communications server 120. A secure communications client 112 may include, for example, a virtual private network (VPN) client and/or other communications module. In certain cases, a VPN client includes a per-application VPN client. A secure communications server 120 may include a VPN server and/or communications server. In certain cases, a VPN client (a secure communications client 112) and a VPN server (a secure communications server 120) establish a first secure communications tunnel 150. A secure communications tunnel may be established (e.g., created, implemented, set up, formed, etc.) using a secure communications protocol such as, for example, Secure Sockets Layer (SSL), Transport Layer Security (TLS), Internet Protocol Security (IPSec), Layer 2 Tunneling Protocol (L2TP), Point-to-Point Tunneling Protocol (PPTP), and/or any other secure communications protocol. A secure tunnel 150 established between the secure communications client 112 and secure communications server 120 may include and/or be referred to herein as a first secure tunnel, a VPN-level tunnel, a VPN channel, a device-level secure tunnel, an outer secure tunnel, and/or another type of secure tunnel.

In some embodiments, a secure communications client 112 includes a per-application VPN client and a secure communications server 120 includes a VPN server. In this case, the per-application VPN client and/or VPN server may, for example, establish separate secure tunnels 150 for each individual application 116, 118 on a device 110. In one example, a secure tunnel 150 between a VPN client and VPN server is established for a managed application 116, such as a managed document collaboration application, to securely transfer to data to server 140, which in this case may include an application backend server for the document collaboration application. Another secure tunnel 150 between the per-application VPN client (or a separate VPN client) and a VPN server may be established for a platform managed application 118, such as a web browser. In certain cases, the two secure tunnels between the VPN client(s) and VPN server include first secure tunnels for each of the applications. In the example shown, one secure outer tunnel 150 is depicted, but the present disclosure contemplates scenarios (as discussed above) in which multiple secure outer tunnels 150 are established.

In various embodiments, a secure communications client 112 (e.g., VPN client), a secure communications server 120 (e.g., VPN server), and/or other nodes monitor data transferred between an application 116, 118 and a server 140 over the secure tunnel 150. For example, an application 116, 118 and an application backend server 140 may use encryption at the application layer, such as SSL, TLS, Hypertext Transfer Protocol Secure (HTTPS), and/or other encryption techniques. The secure communications server 120 may monitor handshake communications between an application 116, 118 and server 140 to establish a second secure tunnel 152. A second secure tunnel 152 may include and/or be referred to herein as an application-layer secure tunnel, an application secure channel, and/or an inner secure tunnel. In some cases, a secure communications server 120 monitors SSL handshake messages sent from an application 116, 118 to a server 140 via the first secure tunnel 150. In one example, the secure communications server 120 monitors handshake messages over the first secure tunnel 150 to detect an SSL ChangeCipherSpec, Finished, and/or other message sent from the application 116, 118 to server 140. The secure communications server 120 may determine based on the SSL ChangeCipherSpec, Finished, and/or other handshake message that the application-level tunnel 152 has been established. Based on the determination that the application-level tunnel 152 has been established, the secure communications server 120 may remove the VPN-level secure tunnel. In one example, the secure communications server 120 removes the VPN-level secure tunnel by ceasing to feed data to encryption-related functions associated with VPN-level secure tunnel, such as SSL wrap and/or unwrap functions.

In various embodiments, the secure communications server 120 monitors communications between an application 116, 118 and a server 140 after the VPN-level secure tunnel 150 has been removed. The secure communications server 120 monitors communications to determine whether the application-level secure tunnel 152 is still in place (e.g., established, intact, on, etc.). In the event it is determined that the application-layer secure tunnel 152 is no longer in place, the secure communications server 120 and/or secure communications client 112 may establish and/or re-establish a VPN-level secure tunnel 150.

In some embodiments, the secure communications client 112 is configured with a driver and/or other module(s) to perform the operations disclosed herein. In certain cases, a device management server 130 provides a configuration profile, a driver, and/or other modules to the device 110. The management agent 114 may, for example, install a driver and/or other modules to configure the secure communications client 112 to perform the operations disclosed herein. For example, the secure communications client 112 may be configured to monitor communications between an application 116, 118 and server 140. Similar to the secure communications server 120, the secure communications client 112 may be configured to monitor data transferred between the secure communications client 112 and secure communications server 120 to, for example, determine whether an application-level secure communications tunnel 152 has been established. The secure communications client 112 may, for example, monitor an SSL handshake between an application 116, 118 and a server 140, such as an application server. Upon detection of a SSL ChangeCipherSpec, Finished, and/or other message send from the application server 140 to the application 116, 118, the secure communications client 112 may determine that an application-level secure tunnel 152 has been established. Based on the determination that the application-level secure tunnel 152 has been established, the secure communications client 112 may remove the VPN-layer encryption tunnel 150. The VPN-layer encryption tunnel 150 may be removed at the secure communications client 112 by, for example, ceasing to feed data to encryption-related functions associated with the first secure tunnel (e.g., SSL wrap/unwrap functions) included in the secure communications client 112. A driver and/or other module associated with secure communications client 112 may cause the VPN-layer encryption tunnel 150 to be removed.

According to some embodiments, the secure communications client 112 monitors communications between an application 116, 118 and a server 140 after the device-level secure tunnel 150 has been removed. In the event it is determined that the application-layer secure tunnel 152 is no longer in place, the secure communications client 112 and/or secure communications server 120 may establish and/or re-establish a secure communications tunnel 150.

Figure 2:
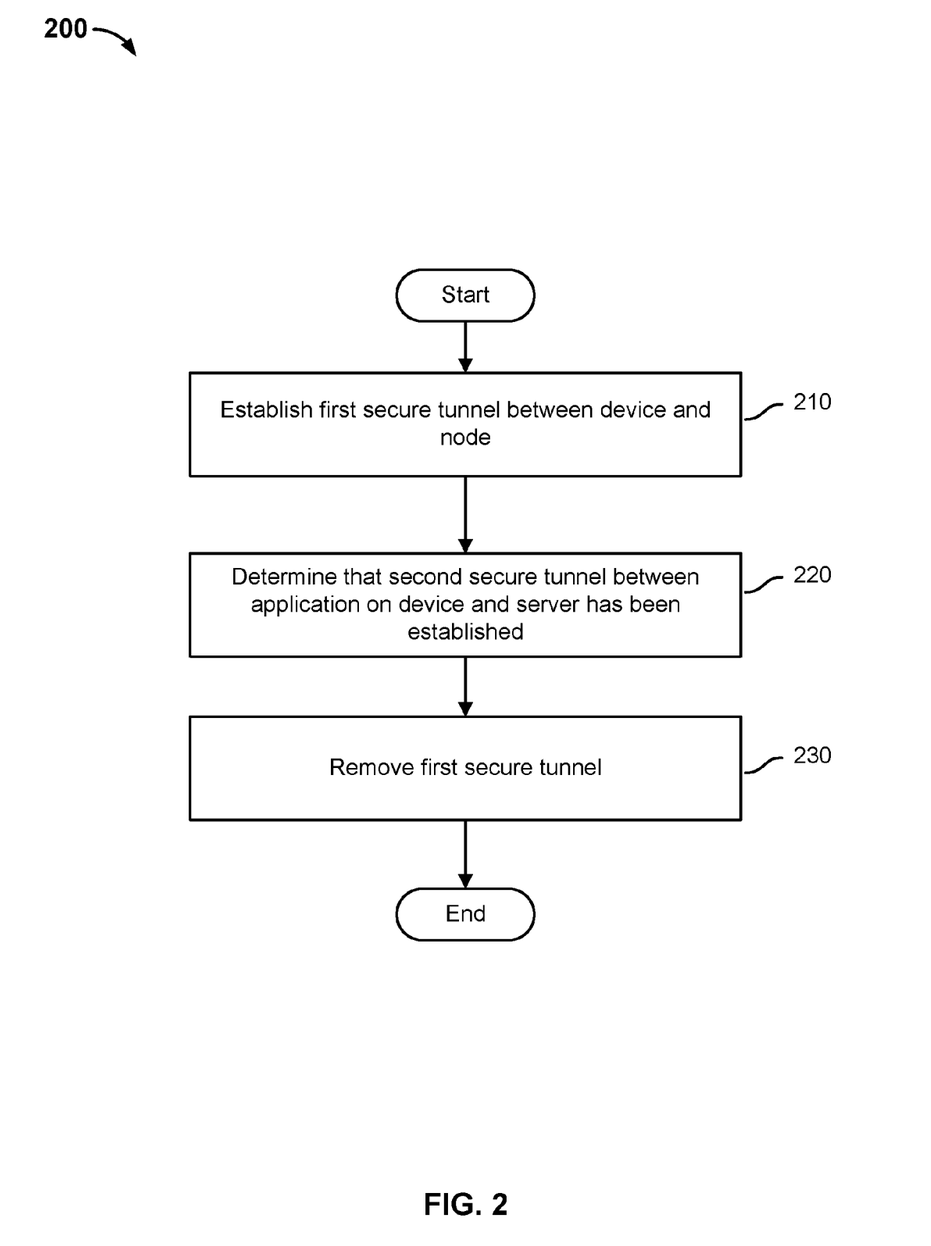
FIG. 2 is a flowchart illustrating embodiments of a process to adaptively optimize encryption.

FIG. 2 is a flowchart illustrating embodiments of a process to adaptively optimize encryption. In various embodiments, the process 200 is performed by secure communications server 120, secure communications client 112, and/or another node of FIG. 1. At 210, a first secure tunnel is established between a device and a node. In various embodiments, a secure communication client (such as a VPN client) on the device and a node (such as a secure communications server, VPN server, etc.) establish a first secure tunnel. In some cases, a secure communications client and secure communications server conduct a handshake operation to establish a secure communications tunnel, such as an SSL tunnel, TLS tunnel, and/or other secure communications tunnel. The first secure tunnel may be used to tunnel application-layer Transmission Control Protocol (TCP) streams between an application and a protected server, such as an application backend server.

At 220, it is determined that a second secure tunnel between an application on the device and a server has been established. In various embodiments, a secure communications server (VPN server) and/or secure communications client (VPN client) monitors data transferred between an application and a server, such as an application server. The data transferred between the application and server may be transmitted over the first secure tunnel (e.g., VPN-level secure tunnel) between the secure communications client and secure communications server. For example, applications on the device may be configured to transmit data to a server via a VPN client (e.g., per-application VPN client) on the device and a VPN server in a network associated with the server. The VPN client and/or VPN server may monitor data transferred between the application and server to determine whether a secure tunnel between the application and server has been established. In some cases, a VPN client and/or VPN server monitors an encryption handshake between the application and server. The VPN client and/or VPN server may detect an encryption handshake message indicating that a secure tunnel has been established between the application and server. In one example, the application and server may conduct an SSL handshake, and the VPN client may detect a message sent from an application to the server that indicates that the SSL handshake is substantially complete, such as a ChangeCipherSpec message, a Finished message, and/or other message. In certain cases, an SSL ChangeCipherSpec message may indicate that the application and server have agreed upon encryption key(s), cipher suites, and/or other information. And messages transferred between the application and server after the ChangeCipherSpec message may be encrypted using the encryption key(s), cipher suites, and/or other information negotiated during the SSL handshake. Based on a determination that subsequent data sent from the application to a server will be encrypted, it may be determined that a second secure tunnel (e.g., application-layer tunnel) has been established between an application and a server.

At 230, a first secure tunnel is removed based on the determination that the second secure tunnel has been established. Based on a determination that a second secure tunnel has been established between an application and a server, it may be determined that the first secure tunnel (e.g., VPN-level tunnel, VPN channel, etc.) may not be necessary. For example, it may be determined that data transferred between the application and server will be encrypted and securely transferred between the application to the server via the second secure tunnel (e.g., application-level tunnel). It may therefore not be necessary to encrypt the already encrypted data for transmission over the first secure tunnel.

In various embodiments, the first secure tunnel (e.g., a VPN-level tunnel) between a secure communications client (e.g., VPN client) and secure communications server (e.g., VPN server) is removed. In certain cases, the first secure tunnel between the VPN client and VPN server is removed by disabling encryption between the VPN client and the VPN server. In some cases, the first secure tunnel may be removed by bypassing encryption-related functions associated with the first secure tunnel. In one example in which the first secure tunnel includes and SSL tunnel, SSL wrap and/or unwrap functions used to encrypt data transferred between a VPN client and VPN server are bypassed. A VPN server may, for example, disable encryption associated with the first secure tunnel by bypassing and/or disabling SSL wrap and/or unwrap functions associated with the first secure tunnel. In another example, a driver associated with a VPN client may disable encryption associated with the first secure tunnel by bypassing SSL wrap and/or unwrap functions at the VPN client. In various embodiments, once the first secure tunnel has been removed and/or disabled, data transferred between the application and server is not encrypted at the VPN-layer and may be only encrypted at the application layer. As a result, double encryption may be avoided and/or minimized using the techniques disclosed herein.

Figure 3:
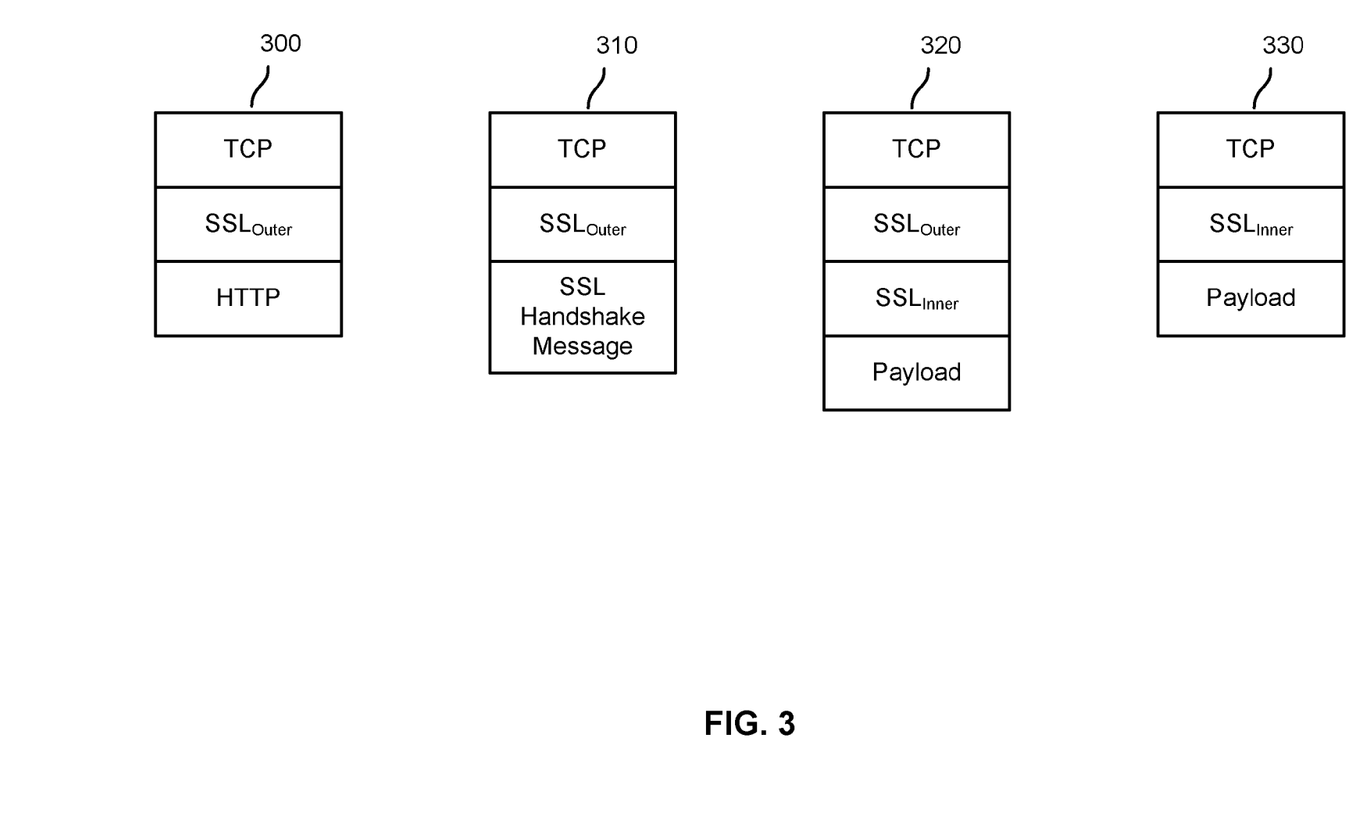
FIG. 3 is a block diagram illustrating embodiments of various data packets.

FIG. 3 is a block diagram illustrating embodiments of various data packets. In the example shown, a first packet 300 includes a packet transferred between a secure communications client and a secure communications server over a first secure tunnel, such as an outer encryption tunnel, VPN-level tunnel, and/or other tunnel. A first packet 300 includes a TCP packet in which an HTTP payload is encrypted using SSL encryption associated with an outer tunnel (VPN-level encryption tunnel). The first packet 300 may include an HTTP payload transferred between an application and a server via a VPN client and VPN server during operation of an application. The first packet 300 may include a single level of encryption—outer SSL encryption (e.g., VPN-level encryption). A second packet 310 includes a TCP packet transferred between an application and server during an application-level SSL handshake. The second packet 310 includes an SSL handshake message from, for example, an application to a server. The second packet 310 includes a single level of encryption—outer SSL encryption (e.g., VPN-level encryption). A third packet 320 includes a TCP packet transferred between an application and a server in a traditional system (e.g., a prior art system). The third packet 320 includes multiple levels of encryption—outer SSL encryption (e.g., VPN-level encryption) and inner SSL encryption (e.g., application-layer encryption). The third packet 320 may unnecessarily include two levels of encryption and/or may be double encrypted. The techniques disclosed herein may be used to avoid a situation in which a packet includes two layers of encryption and/or double encryption. A fourth packet 330 includes a TCP packet transferred between an application and a server after a first secure tunnel (e.g., VPN-level encryption) has been removed. The fourth packet 330 includes a payload encrypted using the SSL and/or another encryption mechanism associated with an application-level secure tunnel (e.g., inner secure tunnel). The fourth packet 330 includes a single level of encryption—inner SSL encryption (e.g., application-level encryption).

Figure 4:
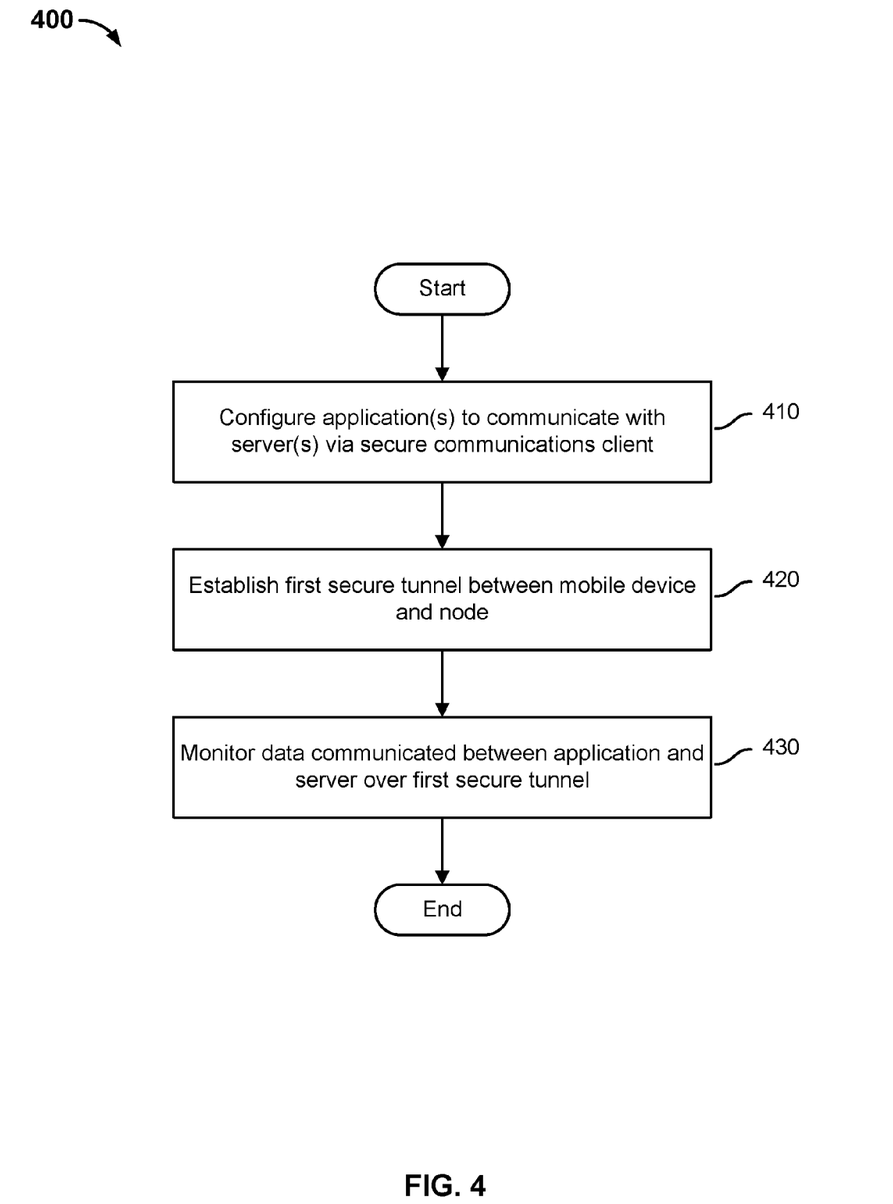
FIG. 4 is a flowchart illustrating embodiments of a process to establish a first secure tunnel.

FIG. 4 is a flowchart illustrating embodiments of a process to establish a first secure tunnel. In various embodiments, the process 400 is performed at device 110 of FIG. 1.

At 410, applications are configured to communicate with servers via a secure communications client. In various embodiments, one or more applications on a mobile device are configured to communicate with nodes within a network using a secure communications client, such as a VPN client. In some cases, an application (e.g., application 116, 118 of FIG. 1) is configured to communicate with a server (e.g., server 140 of FIG. 1) via a per-application VPN. An operating system and/or platform management engine associated with the device may be configured to route data sent from an application to a protected server to a VPN client for transmission to the server.

At 420, a first secure tunnel is established between the device and a node. In various embodiments, a secure communication client (e.g., VPN client) on the device establishes a first secure tunnel with a node, such as a secure communications server (e.g., VPN server). In some cases, a SSL tunnel, TLS tunnel, and/or other type of secure tunnel is established between a VPN client on the device and a VPN server. In certain cases, the first secure tunnel may be established for an application (e.g., a specific application) on the device, and in that case, the first secure tunnel is used to transmit data exclusively for that application. In some cases, other VPN-level tunnels (e.g., first secure tunnels) are established for other applications on the device.

At 430, data communicated over the first secure tunnel between an application and a server is monitored. In various embodiments, a secure communications server (e.g., VPN server) monitors communications between an application and a server to determine whether a second secure tunnel (e.g., application-level secure tunnel) between the application and the server has been established. For example, a VPN server may monitor an SSL and/or other encryption-related handshake to determine whether a second secure tunnel has been established between the application and the server.

Figure 5:
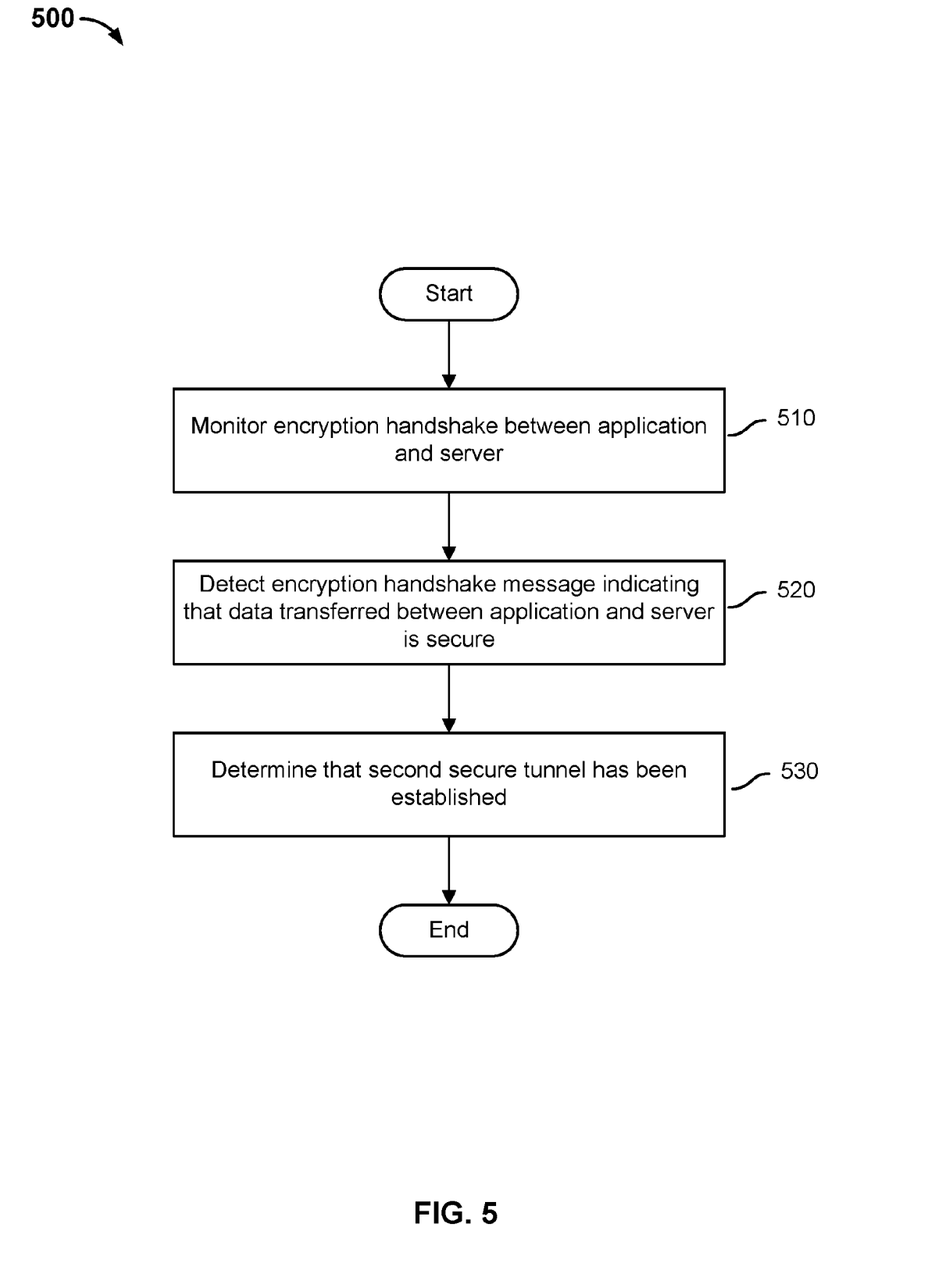
FIG. 5 is a flowchart illustrating embodiments of a process to determine that an application-level secure tunnel has been established.

FIG. 5 is a flowchart illustrating embodiments of a process to determine that an application-level secure tunnel has been established. In various embodiments, the process 500 may be performed at secure communications client 112, secure communications server 120, and/or another node of FIG. 1. At 510, an encryption handshake between an application and a server is monitored. In various embodiments, an application and/or application server may be configured by an application developer and/or other entity to establish an application-level secure tunnel between the application and server. For example, an application and/or application server may initiate an encryption handshake independent of any command from the secure communications client (e.g., VPN client), operating system, and/or other components on the device.

In various embodiments, an application and a server, such as an application backend server, exchange encryption handshake messages over the first secure tunnel. The encryption handshake may be conducted over a first secure tunnel between, for example, the secure communication client (e.g., VPN client) on the device and a secure communications server (e.g., VPN server). In one example, an application and a server conduct an SSL, TLS, and/or other handshake over the first secure tunnel. An application may initiate the SSL handshake by sending a ClientHello to the server. The secure communications client (e.g., VPN client) at the device and secure communications server (e.g., VPN server) may monitor and/or evaluate the contents of the ClientHello message. The server may respond with a ServerHello, Certificate, ServerKeyExchange, CertificateRequest, and/or ServerHelloDone messages. The secure communications client and/or secure communications server may evaluate these messages from the server to the application. The application may respond with a Certificate, ClientKeyExchange, CertificateVerify, ChangeCipherSpec, and/or Finished messages. The secure communications client and/or secure communications server may evaluate these messages from the application to the server. As discussed below, the ChangeCipherSpec message may indicate that the key exchange and authentication processes were successful and that subsequent records will be protected under the newly negotiated cipher suite and keys. The server may respond with a ChangeCipherSpec message and Finished message.

At 520, an encryption handshake message may be detected that indicates that data transferred between the application and server is secure. In various embodiments, an encryption handshake message is received at a secure communications server and/or secure communication client that indicates that subsequently transferred data between the application and server is secure. Continuing with the example above, an application and server may exchange SSL handshake messages. When the secure communications server detects a ChangeCipherSpec message sent from the application to the server, it may indicate that the key exchange and authentication processes were successful and that subsequent records will be protected under the newly negotiated cipher suite and keys. In another example, a ChangeCipherSpec message sent from a server to an application is detected at a secure communications client on the device. A ChangeCipherSpec message is one example encryption handshake message, which may indicate that a secure tunnel has been established. This disclosure is, however, not limited to the detection of ChangeCipherSpec messages.

At 530, it is determined that a second secure tunnel has been established. In various embodiments, the secure communication server and/or secure communications client determine that an application-level secure tunnel has been established between the application and the server. For example, an encryption handshake message may be received that indicates that a secure tunnel has been established, and based on the received encryption handshake message, it is determined that a secure tunnel has been established between the application and server. Continuing with the example above, a ChangeCipherSpec message indicates that the key exchange and authentication processes between the application and server were successful and that subsequent records will be protected under the newly negotiated cipher suite and keys. In other words, the ChangeCipherSpec message may indicate that a secure tunnel has been established between an application and a server, and/or that the SSL handshake is substantially complete.

Figure 6:
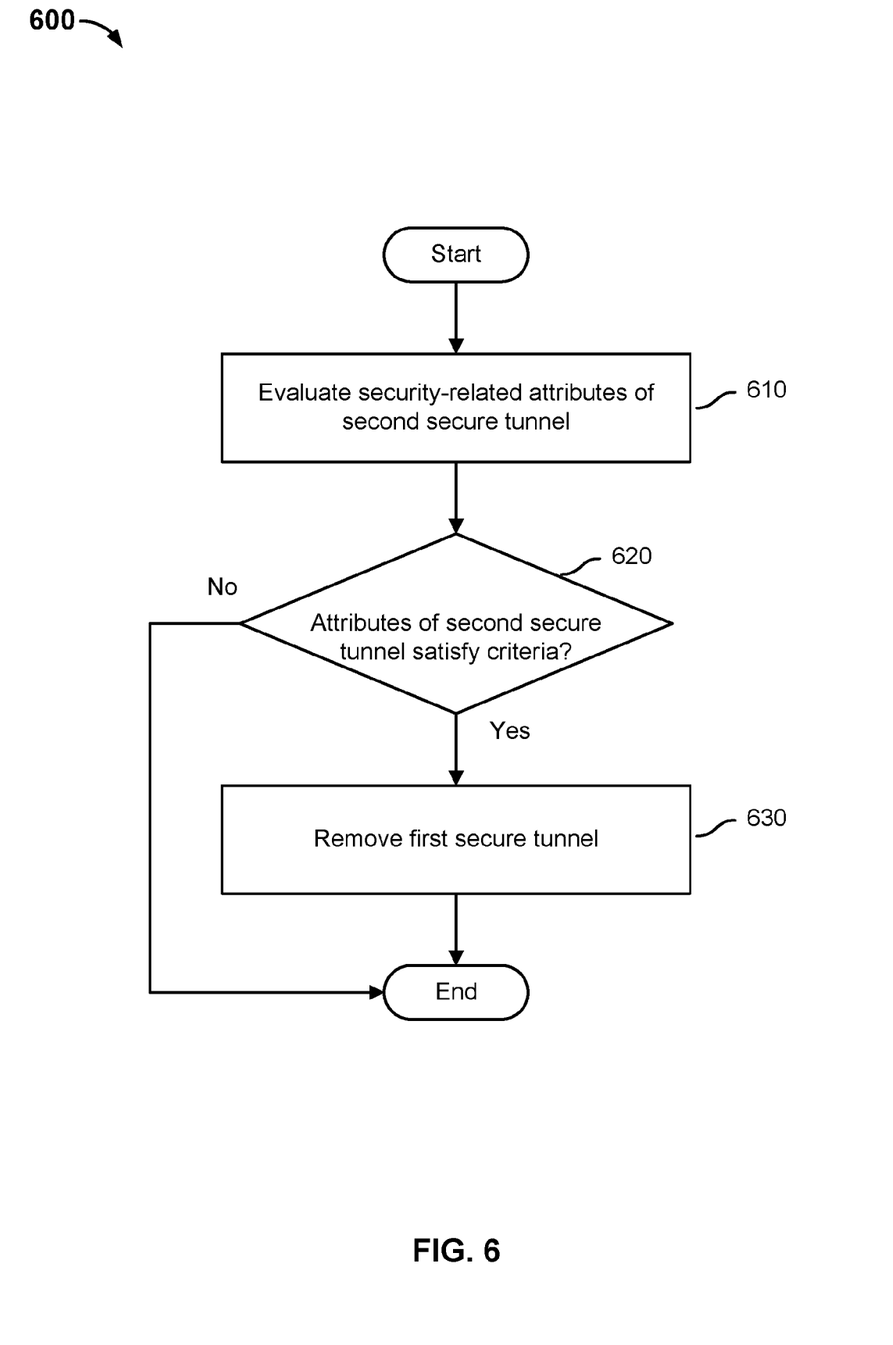
FIG. 6 is a flowchart illustrating embodiments of a process to determine that an application-level secure tunnel is sufficiently secure.

FIG. 6 is a flowchart illustrating embodiments of a process to determine that an application-level secure tunnel is sufficiently secure. In various embodiments, the process 600 may be performed at secure communications client 112, secure communications server 120, and/or another node of FIG. 1. At 610, security-related attributes of a second secure tunnel (e.g., an application-level tunnel) are evaluated. At 620, it is determined whether the attributes of the second secure tunnel satisfy one or more criteria. In various embodiments, security-related attributes of an application-level secure tunnel are evaluated and compared to one or more criteria. The criteria may be, for example, defined by an administrator, defined based on enterprise security policies, determined based on the security of a device and/or servers communicating of the over the secure tunnels, and/or other information.

In some cases, a cipher strength associated with cipher suites used to encrypt data transferred over an application-level tunnel is evaluated. As discussed above, a secure communications client and/or secure communications server may monitor encryption handshake communications between an application and a server. In one example, a cipher suite selected by a server and included in a Server-Hello message may be evaluated. The cipher suite may be evaluated to determine whether a cipher strength associated with the cipher suite satisfies one or more criteria. In one example, criteria may require that the cipher strength of the cipher suite used to establish the application-level tunnel be greater than or equal to a cipher strength associated with the first secure tunnel (e.g., device-level tunnel). In the event that the cipher strength of the cipher suite used to establish the application-level secure tunnel is greater than or equal to a cipher strength of the first secure tunnel, the criteria is satisfied. In another example, criteria may require that a cipher strength used to encrypt data in the second secure tunnel be greater than or equal to 128 bits. In the event that the cipher strength of the cipher suite selected by the server is equal to or greater than 128 bits, the criteria may be satisfied. In certain cases, attributes associated with ClientHello.random, ServerHello.random, and/or other values used to encrypt data transferred using the application-level tunnel are evaluated. In one example, a number of bytes included in, a level of entropy associated with, and/or other attributes of the ClientHello.random number and/or ServerHello.random number may be determined and used to evaluate the strength of encryption of the application-level tunnel. If, for example, a level of entropy associated with the ClientHello.random and/or ServerHello.random number is greater than a threshold level of entropy, criteria may be satisfied. In certain cases, keys exchanged between the application and server in, for example, ServerKeyExchange, ClientKeyExchange, and/or other messages may be evaluated. In the event that the keys used to generate the second secure tunnel are greater than a threshold size (e.g., in bits and/or bytes), are associated with at least a predetermined level of entropy, and/or include other attributes, one or more criteria may be satisfied. In some cases, certificates provided by the application and server may be evaluated. For example, a secure communications client and/or secure communications server may determine whether the certificates provided by the application and/or server are valid. In the event that the certificate(s) are valid, criteria may be satisfied.

In the event that attributes associated with the second secure tunnel do not satisfy a criterion, the process may end. In the event that attributes associated with the second secure tunnel do satisfy one or more criteria, the process proceeds to step 630.

At 630, the first secure tunnel is removed. In various embodiments, a first secure tunnel is removed based at least in part on a determination that security attributes of a second secure tunnel satisfy one or more criteria. In some cases, it is determined that security-related attributes of an application-level tunnel (such as cipher strength associated with the application-level tunnel, entropy of values used to establish the application-level secure tunnel, and/or other security attributes) satisfy one or more criteria. The fact that security-related attributes satisfy one or more criteria may indicate that a security of the application-level tunnel is sufficient and/or data transferred over the application-level tunnel is sufficiently secure. Based on a determination that a security of the application-level tunnel is sufficient, it may be determined that the first secure tunnel (e.g., VPN-level tunnel) is not necessary, and the first secure tunnel may be removed (e.g., dropped).

In various embodiments, when attributes associated with an application-level tunnel (e.g., a second secure tunnel) do not satisfy a criterion, it may be determined that the application-level tunnel is not secure and/or not sufficiently secure. Based on a determination that the application-level tunnel is not secure, it may be determined that a VPN-level tunnel (e.g., a first level tunnel) is to be maintained and/or not removed. In some embodiments, upon determining that a first application-level tunnel is not secure, a secure communications client and/or secure communications server may evaluate the security-related attributes of a second application-level tunnel (e.g., second level tunnel) established over the VPN-level tunnel. For example, an application may establish a separate application-level tunnel with each of multiple servers. And security-related attributes of each of the multiple application-level tunnels may be consecutively evaluated using the techniques disclosed herein.

In some embodiments, upon determining that a first application-level tunnel is not secure, a secure communications client and/or secure communications server may evaluate the security-related attributes of a second application-level tunnel (e.g., second level tunnel) established over a second VPN-level tunnel. A second application-level tunnel may be established by an application that is separate from the application associated with the first application-level tunnel. In certain cases, the process of FIG. 6 may be used to consecutively evaluate multiple separate application-level tunnels.

Figure 7:
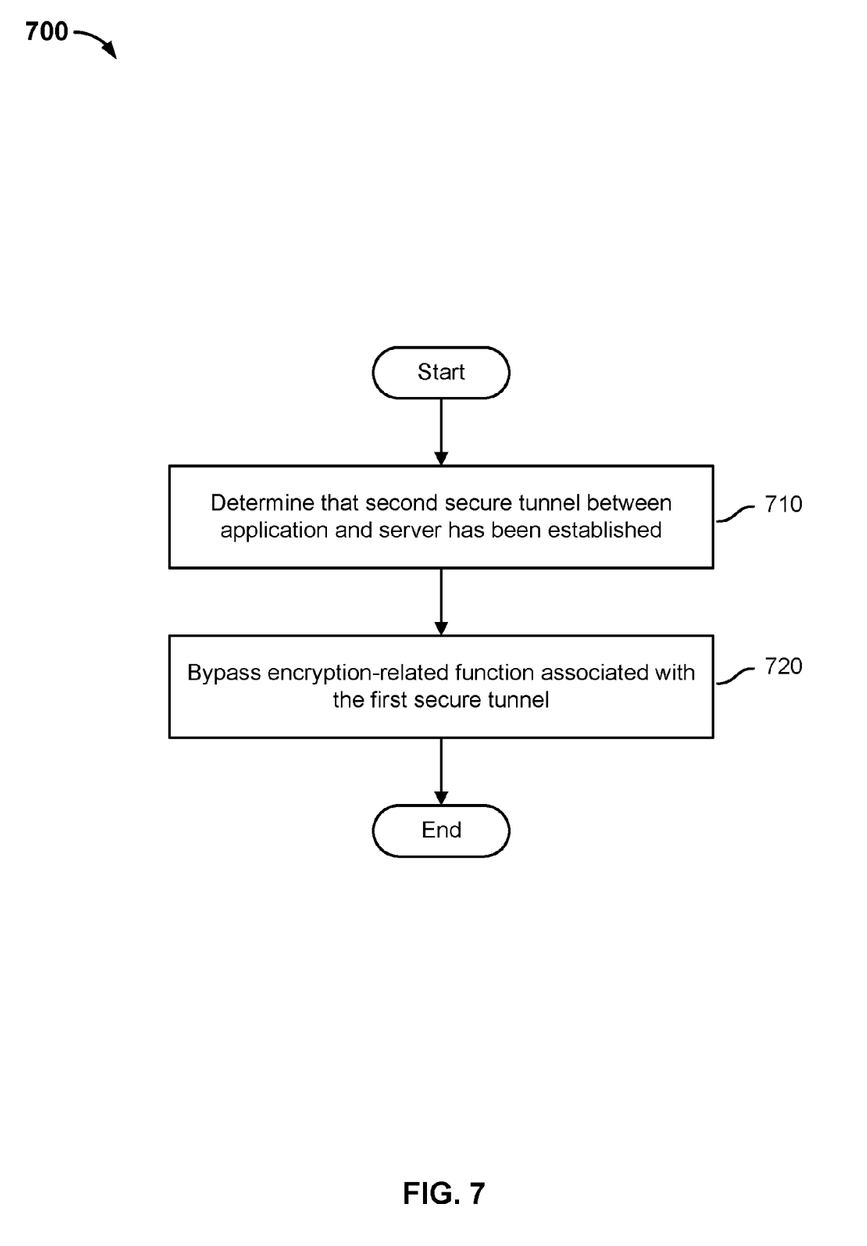
FIG. 7 is a flowchart illustrating embodiments of a process to remove a secure tunnel.

FIG. 7 is a flowchart illustrating embodiments of a process to remove a secure tunnel. In various embodiments, the process 700 may be performed at secure communications client 112, secure communications server 120, and/or another node of FIG. 1. At 710, it is determined that a secure tunnel between an application and a server has been established. In some embodiments, a secure communications client and/or secure communications server determines that an application-level secure tunnel between an application on a device and a service has been established.

At 720, an encryption-related function associated with a first secure tunnel is bypassed. In various embodiments, one or more encryption-related functions are disabled, deactivated, and/or bypassed at a secure communication server, such as a VPN server. In some cases, encryption protocol wrap and/or unwrap functions are bypassed. For example, SSL wrap and/or SSL unwrap functions associated with the first secure tunnel are bypassed. In some cases, encryption wrap and/or unwrap functions are included and/or associated with an encryption handler at the secure communications server, and the encryption handler is bypassed and/or disabled. For example, an SSL handler associated with the secure communication server is bypassed and/or temporarily disabled. The SSL handler may include the SSL wrap and/or unwrap functions. Once the SSL wrap and/or unwrap functions have been bypassed, data passed through the secure communications server is not encrypted and/or decrypted at the VPN-level. The data transferred from the server to the application, however, may still be encrypted at the application-level using, for example, encryption information associated with the second secure tunnel. In other words, the second secure tunnel remains intact after encryption-related functions have been bypassed at the secure communications server.

In some embodiments, one or more encryption-related functions are disabled, deactivated, and/or bypassed at a secure communications client on the device, such as a VPN client. In some cases, encryption protocol wrap and/or unwrap functions are bypassed. For example, SSL wrap and/or SSL unwrap functions associated with the first secure tunnel are bypassed at a VPN client on the device. In one example, a driver, plug-in, and/or other module associated with a VPN client on the device may configure the VPN client to disable SSL wrap and/or SSL unwrap functions at the VPN client. Once SSL wrap and/or other encryption functions have been bypassed at the VPN client, data transferred from an application to a server may not be encrypted at the VPN-level.

In various embodiments, the first secure tunnel is maintained in a deactivated and/or bypassed state. In some cases, references to the first secure tunnel are maintained. For example, the encryption keys, cipher suites, session identifier, certificates, and/or any other information associated with first secure tunnel are maintained. In the event it is determined that the first secure tunnel is to be reestablished, the bypass of the encryption-related functions may be removed and the encryption-related functions reactivated as discussed below.

Figure 8A:
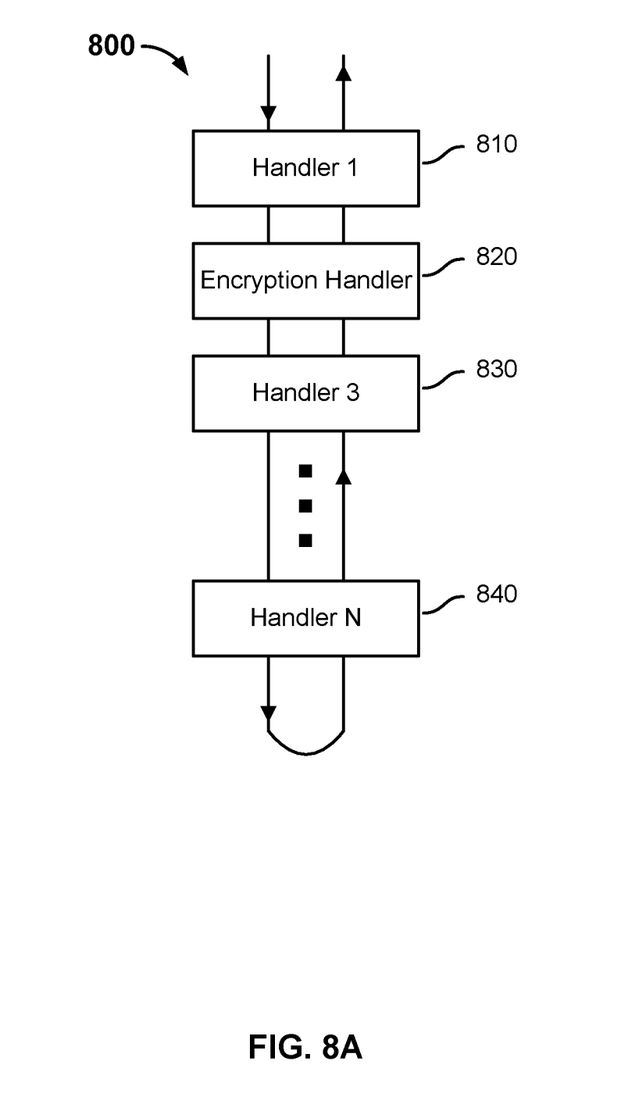
FIG. 8A is a block diagram illustrating embodiments of a processing pipeline of a secure communication server when a first secure tunnel is active.

FIG. 8A is a block diagram illustrating embodiments of a processing pipeline of a secure communication server when a first secure tunnel is active. In the example shown, a data processing pipeline 800 includes a pipeline employed at the secure communications server (e.g., VPN server) when a first level tunnel is active. The arrows indicate the direction of travel of data as it is received at the secure communications server, processed using various handlers, and provided to a destination, such as a mobile device and/or server.

In various embodiments, data is passed through a pipeline 800 including various handlers. A first handler 810 may process a packet using various processing operations, such identifying a sender, destination, size of a packet and/or other information. An encryption handler 820 may include encryption wrap functions used to encrypt data for transfer over a VPN-level tunnel (e.g., first secure tunnel). The encryption handler 820 may include unwrap functions to decrypt data received from, for example, a secure communications client on a device over the first secure tunnel. In one example, an encryption handler 820 includes an SSL handler that includes SSL wrap and/or unwrap functions. A third handler 830 and/or other handlers perform other processing operations to, for example, analyze data transferred between a device and protected servers, modify data transferred between a device and protected servers, block data transferred between a device and protected servers, and/or perform other operations. The pipeline may include one or more additional handlers up to an Nth handler 840. One additional handler may include, for example, an HTTP handler. An HTTP handler may, for example, process an HTTP payload of a packet. The payload may be analyzed to, for example, perform various security-related operations. Another additional handler may include a TCP handler. In various embodiments, the order of the handlers in the pipeline 800 may be based on a configuration of the secure communications server. For example, the HTTP handler, TCP handler, encryption handler 820, and/or other handlers may be arranged in any suitable order in the pipeline 800 depending, for example, on the configuration of the secure communication server.

Figure 8B:
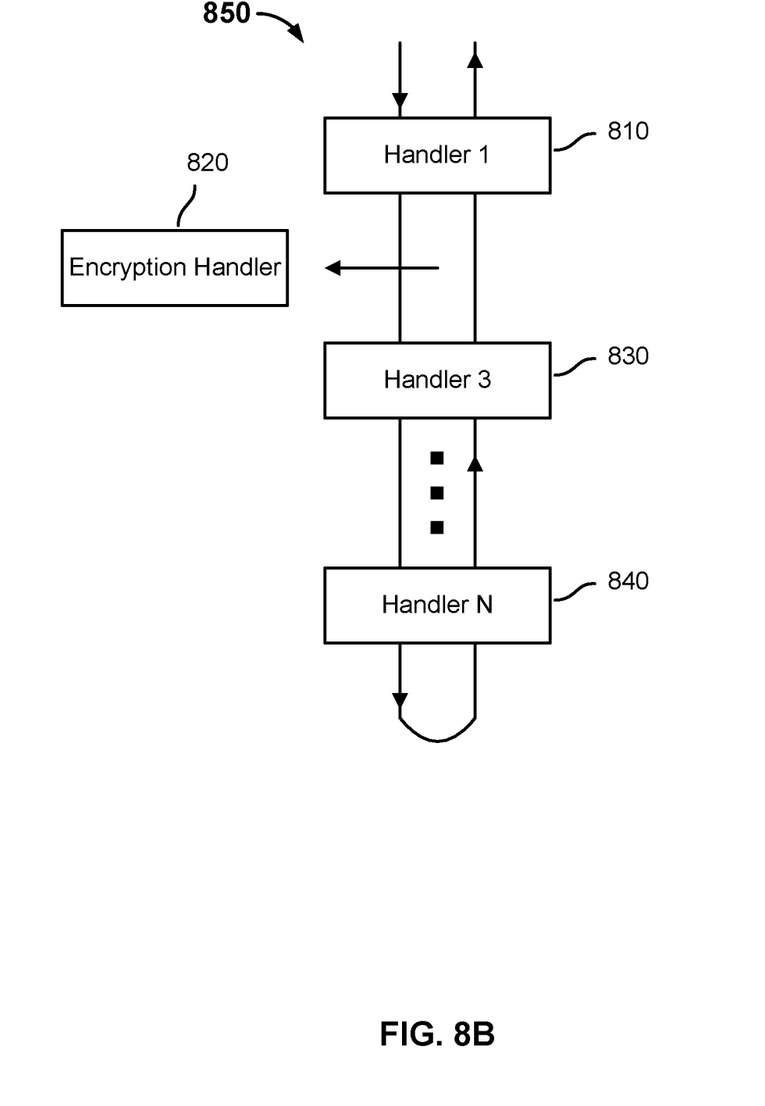
FIG. 8B is a block diagram illustrating embodiments of a processing pipeline of a secure communication server when a first secure tunnel is removed.

FIG. 8B is a block diagram illustrating embodiments of a processing pipeline of a secure communication server when a first secure tunnel is removed. In the example shown, a processing pipeline 850 is similar to the processing pipeline 800 of FIG. 8A. In various embodiments, it is determined that a first secure tunnel, such as a VPN-level tunnel, is to be removed, and an encryption handler 820 associated with the first secure tunnel is removed from the pipeline 850. The encryption handler 820 associated with the first secure tunnel may be removed from the pipeline by, for example, not passing data to encryption-related functions included in the encryption handler 820. For example, data may not be passed to SSL wrap and/or unwrap functions included in the encryption handler 820. The other handlers in the pipeline 850 may remain intact.

In various embodiments, the encryption handler 820 may be reactivated if it is determined that the first secure tunnel is to be re-established. In this case, the encryption handler 820 is added to the pipeline 850, and the pipeline 850 with the encryption handler 820 activated may resemble pipeline 800 of FIG. 8A.

Figure 9:
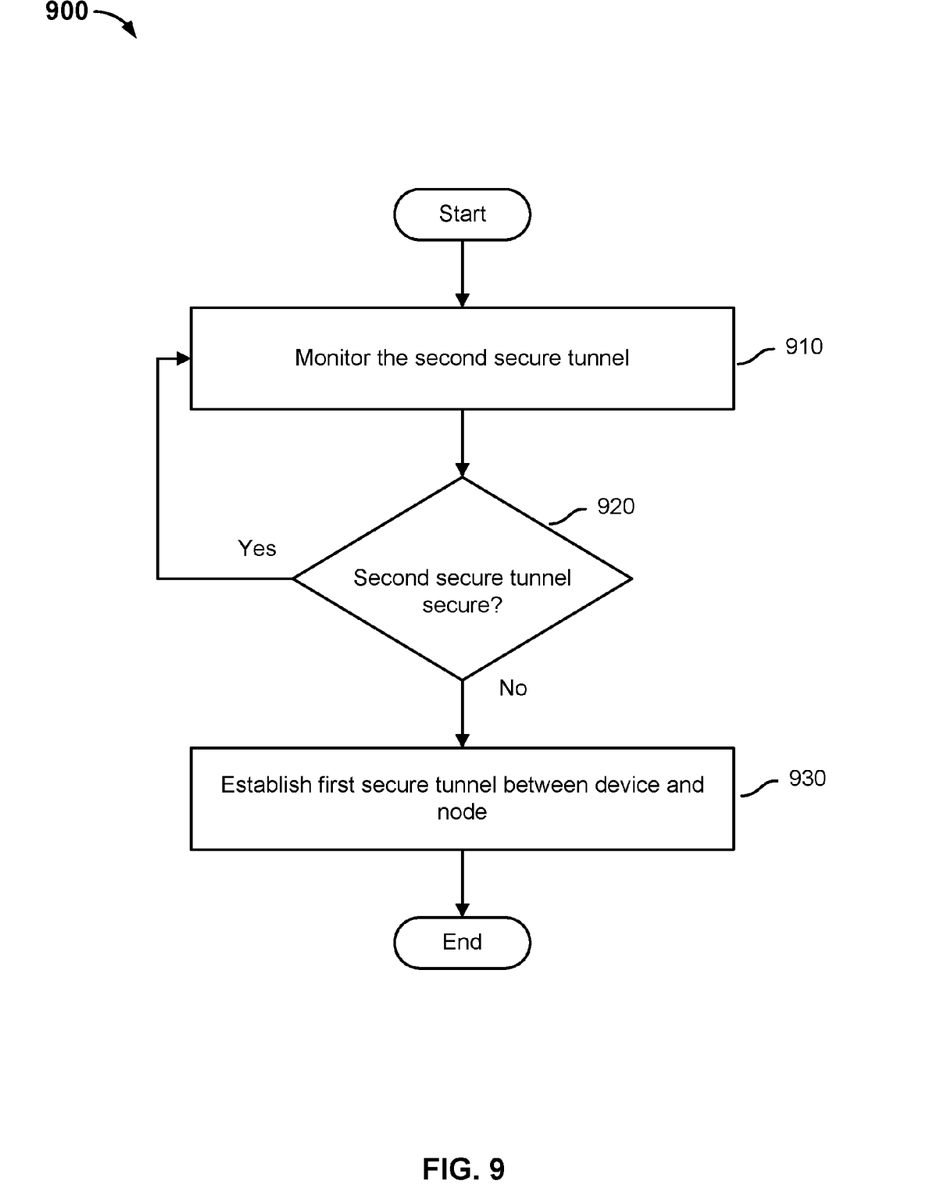
FIG. 9 is a flowchart illustrating embodiments of a process to re-establish a first secure tunnel between a device and a node.

FIG. 9 is a flowchart illustrating embodiments of a process to re-establish a first secure tunnel between a device and a node. At 910, a second secure tunnel is monitored. In various embodiments, data transferred between an application and server over an application-level tunnel is monitored. In some cases, data transferred between an application and server is monitored at a secure communications server, such as VPN server, and/or secure communications client, such as a VPN client. In one example, a VPN server is configured to monitor data transferred between an application and server to determine whether the transferred data is encrypted and/or otherwise secured. The VPN server may, for example, monitor data transferred between the application and server to ensure that a second secure tunnel (e.g., application-level tunnel) is still active, established, and/or intact. In certain cases, an application and/or server may switch back and forth between transferring data in a secure manner (e.g., over an application-level tunnel) and/or transferring data in the clear. The secure communications server is configured to determine whether data transferred between the application and server is secured (e.g., encrypted) and/or in the clear. In one example, a secure communication server may determine whether data is encrypted and/or in the clear by attempting to decipher the contents of a data packet. In the event that contents of the packet are decipherable, it may indicate that the packet includes unencrypted data and the application-level tunnel has been removed. In various embodiments, a secure communications client (e.g., VPN client) and/or a driver, plug-in, or other component associated with the secure communications client performs similar monitoring operations.

At 920, it is determined whether a second secure tunnel is secure. In various embodiments, it is determined whether an application-level secure tunnel between an application and server has been removed. In one example, it may be determined whether data transferred between an application and server is encrypted. In the event data transferred between an application and server is determined to be encrypted, it may be determined that a second secure tunnel (e.g., application-layer tunnel) is secure. In the event data transferred between an application and server is in the clear, it may be determined that a second secure tunnel has been removed and/or is not secure. In another example, a variety of indicators may be evaluated to determine whether the second secure tunnel is intact and/or secure. In the event it is determined that the second secure tunnel is secure, the process proceeds to step 910 and the secure communications server and/or secure communications client continue to monitor the second secure tunnel. In the event it is determined that the second secure tunnel is not secure, the process proceeds to step 930.

At 930, a first secure tunnel is established between the device and node. In various embodiments, a first secure tunnel (e.g., VPN-layer tunnel) is reestablished between a secure communications client and secure communications server. As discussed above, records associated with the first secure tunnel are maintained when the first secure tunnel is removed, and the maintained records may be used to re-establish the first secure tunnel upon a determination that an application level tunnel has been dropped.

In various embodiments, the process 900 may be performed repeatedly as an application and/or protected server switch from secured to unsecured communication. Data transferred between an application and server may be continuously monitored, and the first secure tunnel (e.g., VPN-level tunnel) may be activated and/or deactivated depending on the state of the application-level tunnel between the application and server. For example, an application session may switch back and forth between clear and secure depending on the protected resource with which it is communicating and depending on whether the session is clear or secure, different levels of encryption may be necessary. In the event it is determined that the application-level tunnel is active and/or secure, the VPN-level tunnel is removed and/or dropped. In the event it is determined that the application-level tunnel is not active and/or secure, the VPN-level tunnel is (re)established and/or activated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   establishing a first secure tunnel between a device and a node;
   maintaining information associated with the first secure tunnel, wherein the information is used to re-establish the first secure tunnel;
   determining that a second secure tunnel between an application on the device and a server has been established, wherein the second secure tunnel is established at least in part using the first secure tunnel; and
   removing the first secure tunnel based at least in part on the determination that the second secure tunnel has been established.

2. The method of claim 1, wherein the server includes an application server associated with the application.

3. The method of claim 1, wherein the first secure tunnel includes a secure virtual private network (VPN) tunnel associated with the application.

4. The method of claim 1, wherein the first secure tunnel includes one or more of a Secure Sockets Layer (SSL) tunnel and a Transport Layer Security (TLS) tunnel.

5. The method of claim 1, wherein the second secure tunnel includes one or more of a Secure Sockets Layer (SSL) tunnel, a Transport Layer Security (TLS) tunnel, and a Hypertext Transfer Protocol Secure (HTTPS) connection established between the application and the server.

6. The method of claim 1, wherein establishing the first secure tunnel includes establishing the first secure tunnel between a VPN client on the device and the node comprising a VPN server.

7. The method of claim 1, wherein determining that the second secure tunnel has been established includes determining that an encryption handshake between the application and the server is substantially complete.

8. The method of claim 1, determining that the second secure tunnel has been established includes:
   monitoring an encryption handshake between the device and the server;
   detecting an encryption handshake message indicating that data transferred between the application and the server is secure; and
   determining that the second secure tunnel has been established based at least in part on the detected encryption handshake message.

9. The method of claim 8, wherein the detected encryption handshake message includes an Secure Sockets Layer (SSL) ChangeCipherSpec message.

10. The method of claim 8, wherein the detected encryption handshake message includes a Secure Sockets Layer (SSL) Finished message.

11. The method of claim 1, further comprising:
    determining that security-related attributes associated with the second secure tunnel satisfy one or more criteria; and
    wherein removing the first secure tunnel further comprises removing the first secure tunnel based at least in part on the determination that the security-related attributes associated with the second secure tunnel satisfy the criteria.

12. The method of claim 11, wherein determining that the security-related attributes associated with the second secure channel satisfy the criteria includes determining that a cipher strength associated with the second secure tunnel is at least equal to a cipher strength associated with the first secure tunnel.

13. The method of claim 1, wherein removing the first secure tunnel includes bypassing encryption-related functions associated with the first secure tunnel.

14. The method of claim 13, wherein the encryption-related functions include Secure Sockets Layer (SSL) wrap and unwrap functions.

15. A method further comprising:
    establishing a first secure tunnel between a device and a node;
    determining that a second secure tunnel between an application on the device and a server has been established, wherein the second secure tunnel is established at least in part using the first secure tunnel;
    removing the first secure tunnel based at least in part on the determination that the second secure tunnel has been established;
    monitoring the second secure tunnel;
    determining that the second secure tunnel is not secure; and
    establishing the first secure tunnel between the device and the server.

16. The method of claim 15, wherein determining that the second secure tunnel is not secure includes determining that the second secure tunnel has been removed.

17. A system, comprising:
    a processor; and
    a memory coupled with the processor, wherein the memory is configured to provide the processor with instructions which when executed cause the processor to:
    establish a first secure tunnel between a device and a node;
    maintain information associated with the first secure tunnel, wherein the information is used to re-establish the first secure tunnel;

determine that a second secure tunnel between an application on the device and a server has been established, wherein the second secure tunnel is established at least in part using the first secure tunnel; and remove the first secure tunnel based at least in part on the determination that the second secure tunnel has been established.

18. The system recited in claim 17, wherein the processor is configured to determine that the second secure tunnel has been established at least in part by:

monitoring an encryption handshake between the device and the server;

detecting an encryption handshake message indicating that data transferred between the application and the server is secure; and determining that the second secure tunnel has been established based at least in part on the detected encryption handshake message.

19. A computer program product, the computer program product being embodied in a tangible computer readable storage medium and comprising computer instructions for:

establishing a first secure tunnel between a device and a node;

maintaining information associated with the first secure tunnel, wherein the information is used to re-establish the first secure tunnel;

determining that a second secure tunnel between an application on the device and a server has been established, wherein the second secure tunnel is established at least in part using the first secure tunnel; and removing the first secure tunnel based at least in part on the determination that the second secure tunnel has been established.

\* \* \* \* \*